United States Patent [19]

Nagel et al.

[11] Patent Number: 4,678,887
[45] Date of Patent: Jul. 7, 1987

[54] METHOD AND APPARATUS FOR RESISTANCE WELDING

[75] Inventors: Gregory L. Nagel, Royal Oak; Anthony Lee, West Bloomfield; Warren D. Hill, Lake Orion, all of Mich.

[73] Assignee: General Motors Corporation, Detroit, Mich.

[21] Appl. No.: 883,781

[22] Filed: Jul. 9, 1986

[51] Int. Cl.⁴ ............................................. B23K 11/24
[52] U.S. Cl. ................................... 219/117.1; 219/110
[58] Field of Search .............. 219/108, 109, 110, 117.1

[56] References Cited

U.S. PATENT DOCUMENTS

| | | | |
|---|---|---|---|
| 4,419,560 | 12/1983 | Zurek | 219/110 |
| 4,447,700 | 5/1984 | Cohen | 219/110 |
| 4,456,810 | 6/1984 | Schumacher et al. | 219/110 |

FOREIGN PATENT DOCUMENTS

| | | | |
|---|---|---|---|
| 2024285 | 12/1971 | Fed. Rep. of Germany | 219/110 |
| 2490129 | 2/1984 | France | |
| 59-169686 | 9/1984 | Japan | 219/110 |

OTHER PUBLICATIONS

Schumacher et al, "Resistance Spot Welding Control that Automatically Selects the Welding Schedule for Different Types of Steel", SAE paper No. 850407, 1985.

*Primary Examiner*—Clifford C. Shaw
*Attorney, Agent, or Firm*—Warren D. Hill

[57] ABSTRACT

A method and apparatus are disclosed for resistance spot welding including applying a preconditioning pulse at the beginning of a welding process to stabilize the resistances at the interface of the sheets being welded and at the interface of the electrodes and the sheets. A current pulse is applied just after contact of electrodes and the workpiece when the electrode force is between about 10% and 75% of its final value to melt interface surfaces followed by a cooling time to permit dissipation of heat from the interfaces, and is finally followed by a conventional weld current schedule. The contact time is determined be electrically monitoring the conductivity between the electrodes as they are moved toward the workpiece. Alternatively, the applied electrode pressure is monitored to determine when sufficient electrode force is applied to the workpiece to achieve the proper resistance for the pulse application.

14 Claims, 8 Drawing Figures

METHOD AND APPARATUS FOR RESISTANCE WELDING

FIELD OF THE INVENTION

This invention relates to resistance spot welding and particularly to a method and an apparatus for conditioning weld electrodes and workpiece surfaces for predictable weld operation over a wide variety of processing and material conditions.

BACKGROUND OF THE INVENTION

The art of resistance welding has advanced to the point where someone skilled in the art can set a limited number of welding parameters to produce high quality welds for a given weld condition. The American Welding Society and the Resistance Welding Manufacturer's Association have both established recommended practices which are guidelines for the production of high quality welds. Thus, for a given weld condition specifying sheet thickness, material, coating, electrode geometry and type, the guideline will provide a range of electrode force, current level, weld time, and weld spacing and will give the expected weld nugget size and weld shear strength. In practice, however, this process frequently fails to produce high quality welds consistently because of the presence of a large number of often difficult to control variables. Some of these variables are:
1. Coating material
   the type of coating as well as surface contaminants such as paint or grease can cause large changes in the nugget formation time given the same control timing and current
2. Galvanize coating thickness variations
3. Air pressure variations
   this can cause very rapid cap wear due to arcing in the case of pressure drop
   this can also change the time to form a good nugget by a factor of two
4. Air cylinder wear
   this can cause very rapid cap wear due to arcing
5. Rising tip force during a weld
   this can cause uncontrolled nugget formation
6. Operator changes in programmed squeeze time
   this can increase the time to produce a good weld by a factor of two or more given the same current Thus, the recommended practices do not insure good welds under factory conditions where variables can occur. It is desirable, of course, to be able to produce welds in a factory environment with a high degree of confidence in the weld quality. In the automotive industry it is desirable to produce good welds using minimum weld time.

It is a known practice, as disclosed in the Cohen U.S. Pat. No. 4,447,700 to attempt to render the weld process more uniform by applying an initial preheat current pulse for conditioning the workpiece to remedy fit-up and surface problems. It is also known, as disclosed in Schumacher et al. U.S. Pat. No. 4,456,810 to precondition the workpiece by applying low magnitude current pulses after full electrode force is applied, followed by a cooling period, which results in a longer process cycle. The success of these practices is limited, at best, although welds may have been improved in some cases. Consistent improvement has not been realized because heretofore the precise requirements for a preheat pulse have not been known. To be successful it is required that the preheat pulse stabilize the weld process with no sacrifice in weld time and preferably effect a time savings. In the interest of time economy there have been attempts to start current just after the electrodes clamp the workpiece. To accomplish this the welder is set up to apply current at a set time, but the process variations can cause undesired events such as arcing and slow weld nugget development.

SUMMARY OF THE INVENTION

It is therefore an object of the invention to provide an apparatus and a method of weld control which overcome a large number of common variables to produce consistently good welds in a minimum weld time.

It is another object of the invention to provide an apparatus and method which lend such predictability to weld processes that the interpretation of weld parameters enhances the utility of weld feedback control.

It is a further object of the invention to provide a method and apparatus for applying a preheat pulse in a precise manner in a weld current schedule.

The method of the invention is carried out by moving weld electrodes into contact with a workpiece and applying electrode force to the workpiece, determining a preheat pulse time in the period following contact of weld electrodes with the workpiece and prior to attaining full electrode force, applying a preheat current pulse at the preheat pulse time and extending for a time sufficient to melt the workpiece surfaces at the interfaces, inhibiting further weld current for a cooling period after the preheat pulse to allow heat dissipation from the hot interfaces, and then applying a predetermined weld current schedule.

The invention is further carried out by resistance spot welding apparatus comprising; electrode means for contacting and applying force to a workpiece, means for detecting initial engagement of electrodes with the workpiece and generating a trigger signal, and current control means responsive to the trigger signal for (a) applying a preheat current pulse to the workpiece just after the contact between electrodes and workpiece (b) inhibiting current flow for a cooling period, so that the preheat in conjunction with the cooling conditions the interfaces for stable weld operation, and (c) applying weld current to the workpiece according to a weld schedule.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Figure 1:
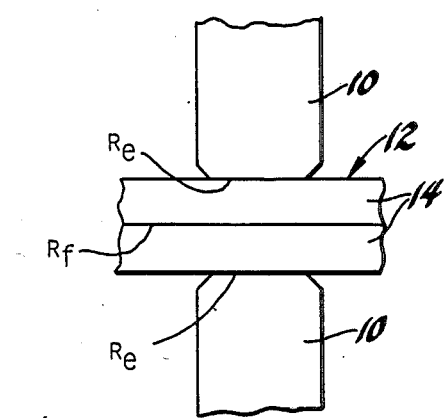
FIG. 1 is a detail of welding electrodes and a workpiece.

FIG. 1 shows a simple welding configuration comprising two spot welding electrodes 10 applying force and weld current to a two-high stack sample 12; that is, the workpiece comprises two metal sheets 14 although it is understood that the workpiece may comprise a larger number of sheets to be welded. The electrical resistance between the electrodes includes not only the bulk resistivity of the metal sheets but also the interface resistance $R_e$ between the electrodes and the sheets and the interface resistance $R_f$ between the sheets. In the initial part of the weld process the interface resistances $R_e$ and $R_f$ are very important since they make up a large portion of the total resistance and they affect the course of the entire weld cycle. The coating on the workpiece, the quality of fit of the workpiece, the electrode clamping force and the electrode condition are a few of the contributors to uncertain initial interface resistances. The variability of those resistances can render the weld process unstable and unpredictable unless managed properly.

Three major goals can be attained if the weld process can be stabilized. First, the process becomes more predictable so that predetermined weld schedules will be more apt to have the intended result. Second, weld time is minimized by stabilizing the influence of the contacts at the earliest possible time. Third, the dynamic resistance curve generated during the weld can be more readily interpreted to yield control parameters for weld feedback control. The resistance curve has been previously recognized to have important potential for analyzing weld quality and controlling welding but the instability of the process heretofore limited its application to a few kinds of welding operations.

Figure 2:
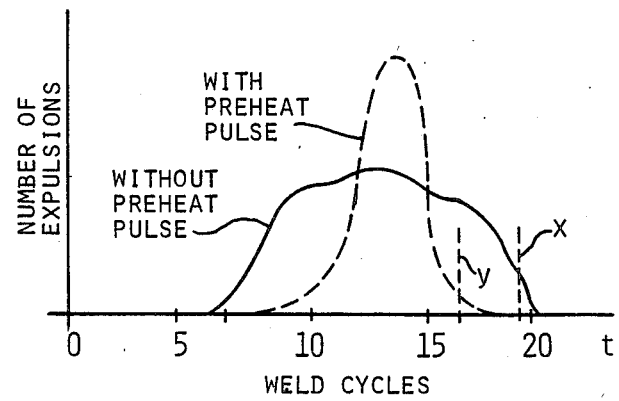
FIG. 2 is a graph illustrating weld time distribution with and without benefit of the invention.

An effect of stabilizing the weld process is illustrated in FIG. 2 which is a graph of the distribution of expulsion times with and without the preheat current pulse as applied according to the invention. The expulsion time is used as a measure of the nugget completion time and as a trigger for weld current termination. Without the preheat pulse the expulsion times are spread over a wide time range. Where a fixed weld termination time is used for weld control the time is set at time X to insure that nearly all of the welds will reach completion. This practice results in long weld times which contribute to slowing production rates and consuming excess energy, and probably also causes unnecessary electrode erosion. Where the preheat pulse is used the welding process is more consistent so that the welds are completed in a narrow time range and less time is required to complete nearly all the welds. Thus the weld termination time is set at time Y to minimize weld time.

The weld process can be stabilized by conditioning the interfaces at the beginning of the weld cycle to have about the same resistances in spite of the many possible variables. The application of a short preheat current pulse at just the right time followed by a cooling period will cause sufficient softening or surface melting at the interfaces and evaporation of surface films and coatings to overcome the conditions which lead to a wide range of resistances and allow good seating of the electrodes against the workpiece and good contact between the sheets. The preheat current pulse must occur very soon after electrode contact with the workpiece while the electrode force is low and the interface resistance is high enough to concentrate heating at the interfaces but not in the bulk material. If the pulse is applied too soon, the interface resistances will be so high and the current so low that suitable heating does not occur, and if applied too late the interfaces resistances will become too low to cause the sufficient heating at the interfaces. An effective preheat pulse should occur after the electrode force has built to about 10% of the steady state force and before attaining about 75% of the steady state force. Then the interface resistances will be right for rapid interface heating without appreciable bulk heating. This stabilization process, if practiced as set forth herein, is effective to compensate for most occurrences of the above enumerated variables in minimum time, although extreme variances are not able to be satisfactorily accommodated.

Surface roughness of the metal sheets or electrodes implies microscopic peaks and valleys which limit contact of the parts to small regions which comprise conductive bridges. Similarly, small scale surface waviness of the sheets initially prevents contact except at crests of the waves. When pressure and current are applied to the weld area under the right conditions the conductive bridges carry current and thus readily soften or melt so that the high spots flatten out and gradually increase the contact area to the fullest extent. The heated metal becomes more pliable so that wavy parts can flatten out under the electrode pressure to enhance bridging. The preheat current pulse can precondition surfaces so that a variety of different sets of parts with initially different degrees of bridging are made somewhat uniform in terms of interface resistance. At the end of the preheat pulse the different sets of parts will still be greatly different with respect to temperature and especially thermal distribution so that if the conventional weld current schedule were started immediately the weld process would often be unstable or unpredictable. A cooling period or, more accurately, a thermal redistribution period following the preheat pulse allows the hot spots to dissipate so that the different sets of parts will be similar and a subsequent weld schedule will be stable and will yield predictable results.

Figure 3:
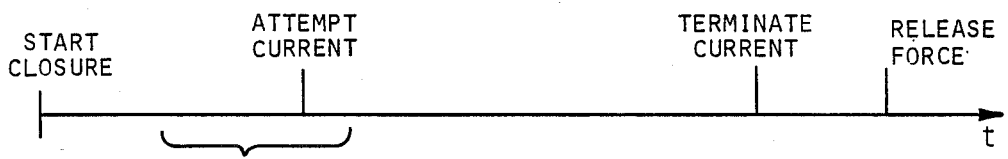
FIG. 3 is a time line illustrating a weld event sequence according to previous conventional practice.

FIG. 3 shows a time line depicting the sequence of events for previous conventional welding procedures. A start electrode closure signal initiates the process and all weld control events programmed by the weld sequence controller are timed from this point. The electrodes advance toward the workpiece and make contact at some variable time after the closure signal. As used herein, contact time is considered to be the time at which good electrical continuity is established between the electrodes. The contact time depends on the rate of closure which is often affected by a sticky air cylinder or poor part fit-up. If the controller attempts to start weld current before the contact time arcing will occur. In any event the weld process will be unpredictable due to the uncontrolled starting conditions. This will be true even if the initial attempted current is a preheat pulse applied at an uncontrolled time with respect to the contact time. As shown on the time line the weld current will terminate and electrode force will be released according to the schedule.

Figure 4:
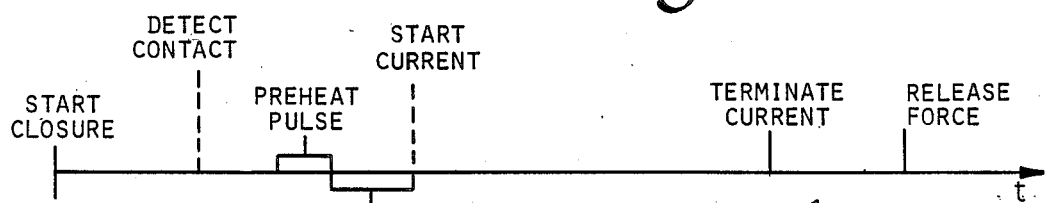
FIG. 4 is a time line illustrating a weld event sequence according to one embodiment of the invention.

A sequence of events according to one embodiment of the invention is revealed on the time line of FIG. 4. After the start closure command the initial engagement of the electrodes with the workpiece is detected and the subsequent weld schedule is timed from that event. The time of contact of the electrodes with the workpiece is the preferred detectable event which is used to identify the initial engagement. The expression "initial engagement" is thus not restricted to initial contact but includes subsequent detectable events which are associated with the early part of the weld cycle when the electrode force is increasing and the interface resistance is decreasing. A preheat pulse is applied to the workpiece shortly after the contact event. The timing of the preheat pulse is very important since it must occur when some electrode force is developed but before the force becomes great enough to lower the interface resistance too much. For a particular weld gun application the timing of the preheat pulse can usually be preset. For a 60 Hz welding power supply the preheat pulse can generally be initiated within one cycle after the contact is detected. The current amplitude of the pulse is preferably about the same as the ensuing weld current but this is not critical and may vary substantially from that value. The duration of the preheat pulse is sufficient to heat the interface regions of the workpiece until softening or some melting occurs at the interfaces and some surface cleaning occurs. Usually one or two cycles is adequate preheat time. Then the preheat pulse is followed by a cooling period which is usually the same length as the preheat pulse or one cycle longer. Weld current is inhibited during the cooling period although small currents are allowable, e.g. for measurement purposes. Commonly the preheat pulse is set to begin one cycle after the contact detection, has a duration of one cycle and is followed by a two cycle cooling period. In some cases the pulse may have a duration of two cycles followed by three cycles of cooling time. Where a dc power supply is used the time periods defined above in terms of cycles will serve as guides for the pulse and cooling period timing.

Figure 5:
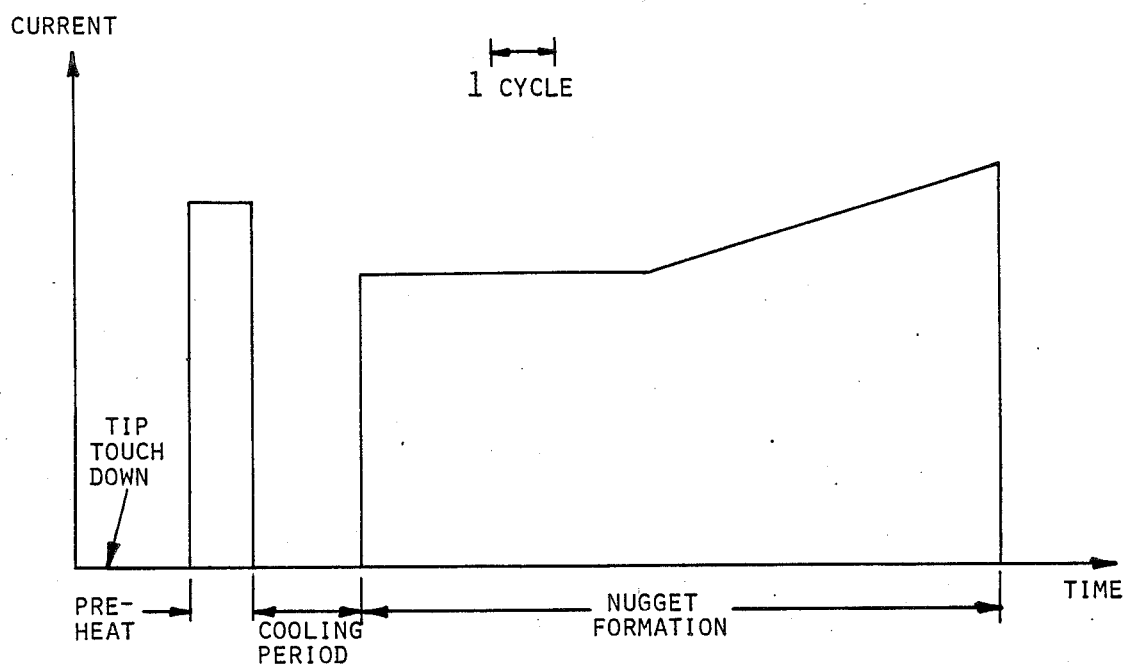
FIG. 5 is a graph illustrating preheat and weld current according to the invention.

The scheduled weld current established according to conventional practice is started at the end of the cooling period. The current is terminated at a time set by the schedule or as indicated by a weld feedback control, and the electrode force is released after a hold period. FIG. 5 shows a graph of current for the preheat pulse and a typical weld schedule.

Figure 6:
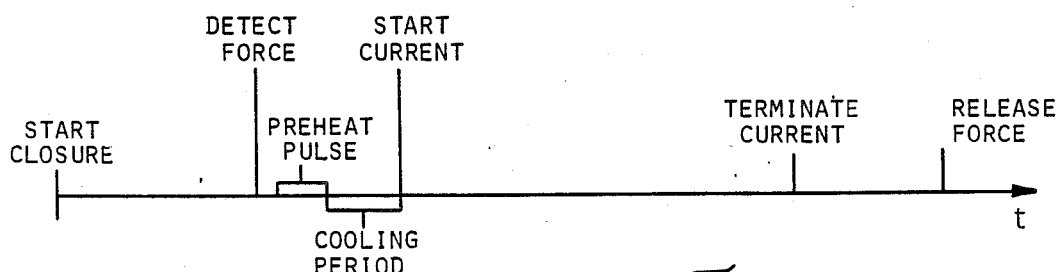
FIG. 6 is a time line illustrating a weld event sequence according to another embodiment of the invention.

Another embodiment of the invention is shown by the time line of FIG. 6. This is similar to the procedure described above except that electrode force is used to signal the initial engagement instead of electrode contact. When a predetermined force is detected the preheat pulse should be initiated as soon as possible. To assure the correct resistance conditions for the preheat pulse, the pulse should be triggered when the force is between 10% and 75% of the steady state force, it being preferred to apply the pulse as soon as possible within the force range. The predetermined force should be at least sufficient to assure that both electrodes make contact with the workpiece. As described above, the preheat pulse is followed by a cooling period and then the weld current schedule. The use of a touchdown detector in conjunction with a short delay time eliminates most of the uncertainties inherent in previously known controls, while the force sensing technique provides even finer control since the electrode force is the prime independent variable affecting the interface resistances.

Figure 7:
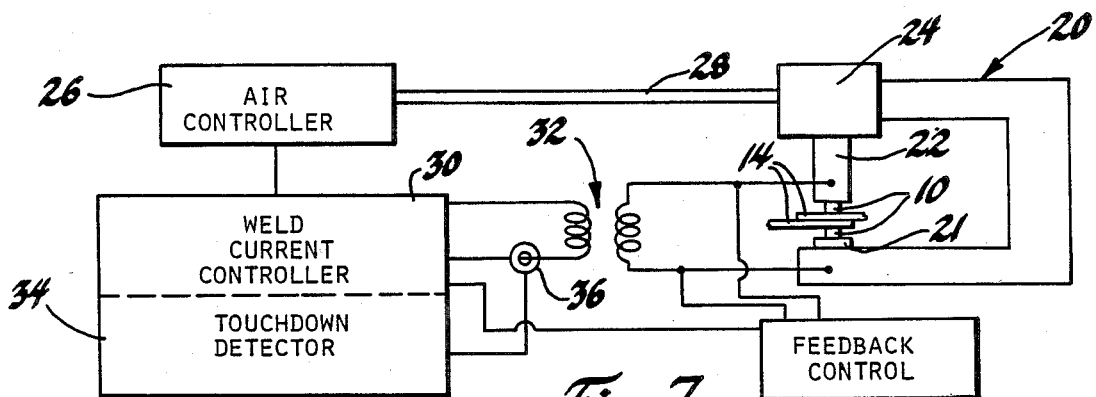
FIG. 7 is a schematic view of apparatus according to the invention for carrying out the method embodiments.

The apparatus for carrying out the procedure is shown in FIG. 7. A welding gun 20 includes a stationary electrode holder 21 and a movable electrode holder 22 which is operated by a pneumatic cylinder 24 for clamping the electrodes 10 against the sheets 14. An air controller 26 supplies air pressure to the cylinder 24 by air lines 28. The air pressure is set for a maximum value corresponding to the steady state electrode force. Current is supplied to the electrodes from a weld current controller 30 by means of a transformer 32. The controller 30 also affords control signals to the air controller 26 to start and finish the weld cycle in concert with the control program. Commercially available controllers 30 are suitable for this application if coupled with a touchdown detector 34 to determine the contact time. The controller is programmed to deliver the preheat current pulse at the proper time, for example one cycle after touchdown, to inhibit welding current for the cooling period and to then proceed with a conventional weld current schedule. The detector 34 includes a current sensor 36 coupled to the transformer primary coil and signals the controller 30 when electrode touchdown occurs. The touchdown detection is known, per se, and operates by initially supplying a low voltage to the transformer primary so that no current flows until the electrodes make contact with the workpiece and detecting that event by the current sensor 36. Other types of touchdown detectors are also useful for this application.

Figure 8:
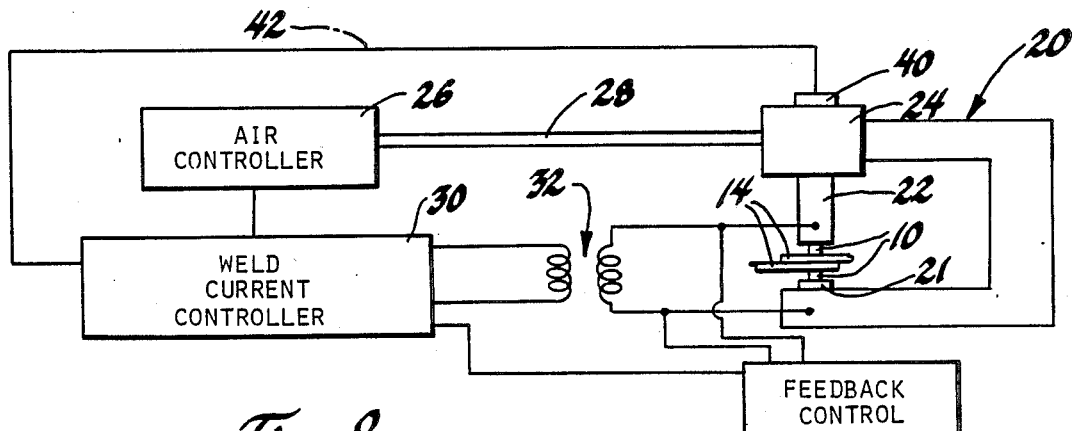
FIG. 8 is a schematic view of the apparatus of FIG. 7 modified according to another embodiment of the invention.

Another sensor for detecting initial engagement instead of the touchdown detector comprises the alternate structure shown in FIG. 8 which is a modification of FIG. 7. An air pressure sensor 40 coupled to the pneumatic cylinder 24 senses the increasing air pressure as the electrode force builds up and sends a corresponding electrical signal via line 42 to the controller 30 or to an auxiliary circuit coupled to the controller which is programmed to initiate a preheat pulse as soon as a predetermined minimum pressure is reached. The air pressure is not necessarily proportional to the electrode force due to losses in sticky pneumatic cylinders and in overcoming stiff weld gun hinges. Care must be exercised to take these factors into account when setting the value of the minimum pressure. Alternate arrangements for sensing electrode force include strain gages coupled to one or both electrode holders 21 and 22. When both electrode holders are instrumented the lower force reading will yield an accurate value of electrode force on the workpiece.

It will thus be seen that the improved welding process and apparatus according to this invention shortens weld time, vastly improves the stability of the welding process and the predictability of the effects of standard weld schedules as well as the interpretability of monitored weld parameter curves in the presence of some common variables of surface condition and applied force.

The embodiments of the invention in which an exclusive property or privilege is claimed are defined as follows:

1. A method of resistance spot welding comprising the steps of:
   moving weld electrodes into contact with a workpiece and applying electrode force to the workpiece, determining a preheat pulse time in the period following contact of weld electrodes with the workpiece and prior to attaining full electrode force, applying a preheat current pulse at the preheat pulse time and extending for a time sufficient to vaporize coatings and melt the workpiece surfaces at the interfaces, inhibiting further weld current for a cooling period after the preheat pulse to allow heat dissipation from the hot interfaces, and then applying a predetermined weld current schedule.

2. A method as defined in claim 1 wherein the duration of the cooling period is of the same order as the duration of the preheat pulse.

3. A method as defined in claim 1 wherein the current pulse amplitude is of the same order of magnitude as the scheduled weld current.

4. A method of resistance spot welding comprising the steps of:

moving weld electrodes into contact with a workpiece and applying electrode force to the workpiece, applying a preheat current pulse between the attainment of about 10% and 75% of full electrode force and extending for a time sufficient to melt the workpiece surfaces at the interfaces thereof, inhibiting further weld current for a cooling period after the preheat pulse to allow heat dissipation from the hot interfaces, and then applying a predetermined weld current schedule.

5. A method of resistance spot welding comprising the steps of:

moving weld electrodes into contact with a workpiece and applying electrode force to the workpiece, detecting the time of contact of electrodes and the workpiece, setting a preheat pulse time a preset interval after the contact time and prior to attaining full electrode force, applying a preheat current pulse at the preheat pulse time and extending for a time sufficient to melt the workpiece surfaces at the interfaces, inhibiting further weld current for a cooling period after the preheat pulse to allow heat dissipation from the hot interfaces, and then applying a predetermined weld current schedule.

6. A method as defined in claim 5 wherein the preheat pulse time is set within one cycle after the contact time.

7. A method as defined in claim 5 wherein the cooling period is of substantially the same duration as the preheat current pulse.

8. A method as defined in claim 6 wherein the cooling period is on the order of one or two cycles.

9. A method of resistance spot welding comprising the steps of:

moving weld electrodes into contact with a workpiece and applying electrode force to the workpiece, sensing a parameter which is a function of electrode force, determining from the parameter a preheat pulse time in the period following contact of weld electrodes with the workpiece and prior to attaining full electrode force, applying a preheat current pulse at the preheat pulse time and extending for a time sufficient to melt the workpiece surfaces at the interfaces, inhibiting further weld current for a cooling period after the preheat pulse to allow heat dissipation from the hot interfaces, and then applying a predetermined weld current schedule.

10. Resistance spot welding apparatus comprising;

electrode means for contacting and applying force to a workpiece, means for detecting initial engagement of electrodes with the workpiece and generating a trigger signal, and current control means responsive to the trigger signal for (a) applying a preheat current pulse to the workpiece for melting interface surfaces prior to attaining full electrode force, (b) inhibiting weld current flow for a cooling period, so that the preheat in conjunction with the cooling conditions the interfaces for stable weld operation, and (c) applying weld current to the workpiece according to a weld schedule.

11. Apparatus as defined in claim 10 further comprising;

means for sensing weld parameters during welding, and means coupled to the current control means and responsive to the sensed parameters for developing a feedback signal for terminating weld current.

12. Resistance spot welding apparatus comprising;

electrode means for contacting and applying force to a workpiece including variable force motor means for providing electrode force, a transducer coupled to the electrode means for generating a signal indicative of electrode force, means responsive to the signal for detecting initial engagement of electrodes with the workpiece and generating a trigger signal at a preset force level, and current control means responsive to the trigger signal for (a) applying a preheat current pulse to the workpiece when the electrode force is initially increasing for melting interface surfaces, (b) inhibiting weld current flow for a cooling period, so that the preheat in conjunction with the cooling conditions the interfaces for stable weld operation, and (c) applying weld current to the workpiece according to a weld schedule.

13. Resistance spot welding apparatus comprising;

electrode means for contacting and applying force to a workpiece including variable air pressure means for providing electrode force, an air pressure transducer for generating a pressure signal indicative of electrode force, means responsive to the pressure signal for detecting initial engagement of electrodes with the workpiece and generating a trigger signal at a preset air pressure level, and current control means responsive to the trigger signal for (a) applying a preheat current pulse to the workpiece to melt interface surfaces, (b) inhibiting current flow for a cooling period, so that the preheat in conjunction with the cooling conditions the interfaces for stable weld operation, and (c) applying weld current to the workpiece according to a weld schedule.

14. Resistance spot welding apparatus comprising;

electrode means for contacting and applying force to a workpiece, means responsive to electrode force for detecting contact of electrodes with the workpiece and generating a contact signal, and current control means responsive to the contact signal for (a) applying a preheat current pulse to the workpiece just after the contact between electrodes and workpiece when electrode force is initially increasing, (b) inhibiting current flow for a cooling period, so that the preheat in conjunction with the cooling conditions the interfaces for stable weld operation, and (c) applying weld current to the workpiece according to a weld schedule.

* * * * *